United States Patent
Bhatt et al.

(10) Patent No.: US 12,229,784 B2
(45) Date of Patent: Feb. 18, 2025

(54) SYSTEMS AND METHODS FOR UTILIZING FEEDBACK DATA

(71) Applicant: Walmart Apollo, LLC, Bentonville, AR (US)

(72) Inventors: Priyanka Bhatt, Haryana (IN); Shankara Bhargava, Santa Clara, CA (US); Akshay Kumar, Rajasthan (IN); Neeraj Agrawal, Agra (IN)

(73) Assignee: Walmart Apollo, LLC, Bentonville, AR (US)

(*) Notice: Subject to any disclaimer, the term of this patent is extended or adjusted under 35 U.S.C. 154(b) by 352 days.

(21) Appl. No.: 17/364,798

(22) Filed: Jun. 30, 2021

(65) Prior Publication Data

US 2023/0004988 A1 Jan. 5, 2023

(51) Int. Cl.
| | |
|---|---|
| *G06Q 10/10* | (2023.01) |
| *G06N 20/00* | (2019.01) |
| *G06Q 10/06* | (2023.01) |
| *G06Q 30/016* | (2023.01) |
| *G06Q 30/02* | (2023.01) |
| *G06Q 30/06* | (2023.01) |
| *G06F 40/30* | (2020.01) |
| *G06Q 10/0837* | (2023.01) |

(Continued)

(52) U.S. Cl.
CPC .......... *G06Q 30/016* (2013.01); *G06N 20/00* (2019.01); *G06F 40/30* (2020.01); *G06Q 10/0837* (2013.01); *G06Q 30/0613* (2013.01); *G10L 15/22* (2013.01)

(58) Field of Classification Search
CPC ............. G06Q 30/016; G06Q 10/0837; G06Q 30/0613; G06N 20/00; G06N 3/04; G06N 3/091; G06F 40/30; G06F 40/216; G06F 40/35; G10L 15/22

USPC .................................................. 705/1.1, 304
See application file for complete search history.

(56) References Cited

U.S. PATENT DOCUMENTS

| | | | |
|---|---|---|---|
| 8,849,730 B2* | 9/2014 | Winn .............. | G06Q 10/10 |
| | | | 706/20 |
| 11,031,001 B1 | 6/2021 | Cheng et al. | |
| 11,429,834 B1* | 8/2022 | Xue .............. | G06F 40/284 |

(Continued)

OTHER PUBLICATIONS

Mohamed, H., & Gouider, M. S. (2020). A survey on intention analysis: Successful approaches and open challenges. Journal of Intelligent Information Systems, 55(3), 423-443. Apr. 25, 2020 (Year: 2020).*

*Primary Examiner* — Jonathan P Ouellette
(74) *Attorney, Agent, or Firm* — Morgan, Lewis & Bockius LLP; Manita Rawat (57) ABSTRACT

A system can receive a first set of data. The first set of data can include information indicating a first set of user sessions and for each of the first set of user sessions having an associated summary and a corresponding agent indicated intent. The system can also, based on the first set of data, determine a set of utterances and for each of the set of utterances a corresponding set of intents. Additionally, the system can receive a second set of data. The second set of data including information indicating a second set of user sessions and for each of the second set of user sessions having an associated determined utterance and corresponding interaction of a user. Moreover, the system can validate a corresponding intent of one or more utterances of the set of utterances, based on the second set of data.

20 Claims, 8 Drawing Sheets

(51) Int. Cl.
  *G06Q 30/0601* (2023.01)
  *G10L 15/22* (2006.01)

(56) References Cited

U.S. PATENT DOCUMENTS

| | | |
|---|---|---|
| 2017/0024375 A1 | 1/2017 | Hakkani-Tur et al. |
| 2019/0294673 A1* | 9/2019 | Sapugay ............... G06F 40/295 |
| 2020/0074993 A1 | 3/2020 | Lee et al. |
| 2020/0097981 A1* | 3/2020 | Teo ...................... G06Q 30/016 |
| 2020/0210649 A1 | 7/2020 | Lewis et al. |
| 2020/0311204 A1* | 10/2020 | Gupta .................... G06N 3/006 |
| 2021/0044547 A1* | 2/2021 | Bradley .................. H04L 51/02 |
| 2021/0058844 A1 | 2/2021 | Ringhiser et al. |
| 2021/0097110 A1* | 4/2021 | Asthana .................. H04L 51/02 |
| 2021/0125025 A1* | 4/2021 | Kuo ........................ G06N 5/04 |
| 2021/0136216 A1 | 5/2021 | Paiva |
| 2022/0046129 A1* | 2/2022 | Clodore ............. G06Q 10/0639 |

* cited by examiner

SYSTEMS AND METHODS FOR UTILIZING FEEDBACK DATA

TECHNICAL FIELD

The disclosure relates generally to systems and methods for utilizing feedback data to optimize models, such as machine learning models.

BACKGROUND

At least some ecommerce marketplaces can include a customer help system that can intelligently and automatically assist customers with issues customers present to the customer help system (e.g., tracking and order, starting a return, tracking a return, etc.). In some examples, customer help systems can be text based. In other examples, customer help systems can be audio based. In some implementations, customer help systems can leverage artificial intelligence models to help route customers to appropriate flows (e.g., starting returns, checking orders, etc.). However, in such implementations, such models can be trained on datasets that are labeled by human agents, and therefore can be less than accurate.

SUMMARY

The embodiments described herein are directed to a system and related methods for reducing noise of a large dataset. The system and methods described herein may be applied to a feedback process for machine learning models that can be used across a variety of applications, such as to retrain a trained machine learning model to discount noise (e.g., data/information that is meaningless) in older training datasets which leads to an improved machine learning model. Said processes can improve the average query time of the trained machine learning model, and improve or make more efficient the utilization of computing resources by the network computing systems. For example, the network computing system uses less computing resources overall because the network computing system can more accurately and efficiently route the user to the appropriate flow faster and with less intervening steps.

In accordance with various embodiments, exemplary systems or network computer systems may be implemented in any suitable hardware or hardware and software, such as in any suitable computing device. For example, in some embodiments, a system can include one or more processors and a set of memory resources to store a set of instructions that when executed by the one or more processors, cause the system to receive a first set of data, the first set of data including information indicating a first set of user sessions, each of the first set of user sessions having an associated summary and a corresponding agent indicated intent. Additionally, execution of the instructions can further cause the system to determine a set of utterances and for each of the set of utterances a corresponding intent, based on the first set of data. Moreover, execution of the instructions can further cause the system to receive a second set of data, the second set of data including information indicating a second set of user sessions, each of the second set of user sessions having an associated determined utterance and corresponding interaction of a user. The execution of the instructions can also cause the system to validate the corresponding intent of one or more utterances of the set of utterances.

In another aspect, the system can, based at least on the second set of data, retrain an intent model. In such aspects, the system retraining the intent model includes, for each of the set of utterances, discounting one or more intents of the corresponding set of intents that were not validated.

In another aspect, retraining the intent model is further based on the first set of data.

In another aspect, the system can determine the set of utterances and for each utterance of the set of utterances the corresponding intent, is further based on one or more template based rules.

In another aspect, the execution of the set of instructions, by the one or more processors, further cause the system to detect an input of a user, and determine an utterance from a plurality of predetermined utterances by processing the input. Additionally, the system can determine a set of predicted intents, based on the determined utterance from the plurality of predetermined utterances, the determined set of utterances, and for each utterance of the set of utterances the corresponding intent. Moreover, the system can generate and transmit user interface instructions to a computing device of the user to cause an application executing on the computing device to generate, on a user interface, a graphical representation of each predicted intent of the set of predicted intents, based on the set of predicted intents.

In another aspect, the interactive information indicates that the user had inputted a second input, the second input being indicative of the user selecting a generated graphical representation of one of the set of predicted intents.

In another aspect, the execution of the set of instructions, by the one or more processors, further cause the system to detect a second input of the user, the second input of the user being indicative of an interaction with a generated graphical representation of one of the set of predicted intents, and based on the second input, determine a corresponding set of selectable features. Additionally, the system can transmit user interface instructions to the computing device of the user to cause the application executing on the computing device to update the user interface to include the corresponding set of selectable features.

In another aspect, each of the set of selectable features are configured to cause the application to perform one or more service operations when interacted with.

In some embodiments, the method can include receiving a first set of data, the first set of data including information indicating a first set of user sessions, each of the first set of user sessions having an associated summary and a corresponding agent indicated intent. Additionally, the method can include determining a set of utterances and for each of the set of utterances a corresponding set of intents, based on the first set of data. Moreover, the method can include receiving a second set of data, the second set of data including information indicating a second set of user sessions, each of the second set of user sessions having an associated determined utterance and corresponding interaction of a user. The method can also include validating the corresponding intent of one or more utterances of the set of utterances.

In various embodiments of the present disclosure, a non-transitory computer readable medium is provided. The non-transitory computer readable medium can have instructions stored thereon, wherein the instructions, when executed by the one or more processors, cause a computing system or system to receive a first set of data, the first set of data including information indicating a first set of user sessions, each of the first set of user sessions having an associated summary and a corresponding agent indicated intent. Additionally, execution of the instructions can further cause the system to determine a set of utterances and for each of the set of utterances a corresponding set of intents, based on the first set of data. Moreover, execution of the instructions can further cause the system to receive a second set of data, the second set of data including information indicating a second set of user sessions, each of the second set of user sessions having an associated determined utterance and corresponding interaction of a user. The execution of the instructions can also cause the system to validate the corresponding intent of one or more utterances of the set of utterances.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

Throughout the drawings, identical reference numbers designate similar, but not necessarily identical elements. The figures are not necessarily to scale, and the size of some parts may be exaggerated to more clearly illustrate the example shown. Moreover, the drawings provide examples and/or implementations consistent with the description. However, the description is not limited to the examples and/or implementations provided in the drawings.

DETAILED DESCRIPTION

The description of the embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. As provided herein, the terms "user" and "customer," are used throughout this application interchangeably to describe a person utilizing an application (e.g., a user client or web application) on a computing device to interact with, such as to make requests or inquiries to, a network computer system (e.g., a customer help system). The terms "couple," "coupled," "operatively coupled," "connected," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

In various examples, machine learning models can be trained on training datasets that include information about resolved user sessions. The training datasets can include data or information, such as a textual transcript of an interaction or conversation between a user and a human agent. Additionally, the human agent can add tags or labels for each subset of the training data set that corresponds to a resolved user session. The tags can indicate an intent or reason a user contacted the agent or interacted with a corresponding customer help system. However, training datasets that are tagged/labeled by human agents can be noisy and include ambiguous and misspelled labels. Additionally, machine learning models that are trained on such noisy training datasets can be inaccurate. Moreover, such training datasets may not be accommodating to new and evolving intents, and therefore cause the trained machine learning models to not be able to keep up with changing demands or evolving language (e.g., slang). Furthermore, unlike conventional approaches that require complex sampling techniques and can require crowd tagged data to remove or minimize the noise in such training datasets, the system and methods described herein are simpler, less burdensome to computational systems, without sacrificing the accuracy.

Among other benefits, examples described herein provide for a network computer system that implements a process that utilizes feedback datasets or user feedback to fine tune a machine learning model trained to determine intents of a user based on determined utterances of a user input (e.g., text or audio based). For example, the network computer system can implement a process that retrains the trained machine learning model to discount noise (e.g., data/information that is meaningless) in older data which leads to an improved machine learning model. Such processes can not only improve the average query time of the trained machine learning model, but it can also improve or make more efficient the utilization of computing resources by the network computing systems (e.g., the network computing system uses less computing resources overall because the network computing system can more accurately route the user to the appropriate flow faster and with less intervening steps).

For example, the network computer system can receive a first set of data or training data set that includes information regarding resolved user sessions, such as a summary pertaining to each resolved user session. Additionally, such information can include a corresponding intent tag or label. In various implementations, a human agent can tag each summary with an intent tag or label to indicate one or more reasons the user interacted with the user help system. However, training datasets that are tagged or labeled by a human agent can be noisy. The network computer system can utilize a feedback dataset or user feedback to discount the noise. For example, the network computer system can train a machine learning model using the first data set that includes information regarding resolved user sessions and corresponding agent tagged intent. Additionally, during sessions of other users, the network computer system can utilize the trained machine learning model to process an input of the users to determine an utterance, and one or more corresponding predicted intents. The network computer system can also present the predicted intents back to the users in the form of associated content (interactive graphical features) generated on the users' mobile device. Additionally, the network computer system can monitor the response or interactions between the users and the presented content. Based on the response of the users, the network computer system can confirm or verify which predicted intent of the presented predicted intents is the correct intent of the user. That way, the network computer system can utilize such response or interaction information to update or retrain the machine learning model to discount predicted intents that the users did not interact with when presented. In some implementations, the network computer system can disassociate the determined utterance from predicted intents that the user did no interact with.

In various examples, such machine learning models can be utilized in user help systems of an ecommerce system to intelligently and automatically assist customers with issues occurring in a corresponding ecommerce system (e.g., tracking and order, starting a return, tracking a return, etc.). In some implementations, user help systems can be text or audio based. For such systems, machine learning models can be leveraged to help route customers to appropriate flows (e.g., starting returns, checking orders, etc.). For example, trained machine learning models can determine one or more utterances based on the user's input. Additionally, the trained machine learning models can also determine one or more intents of the user (e.g., the user's reason for interacting with the customer help system), based on the determined one or more utterances of the user. As such, such systems can route the user to an appropriate flow, based on the determined intent. For example, such systems can utilize a trained machine learning model to determine that a user's intent is to track a recent order based on determined utterance of "where is my order?" Additionally, based on the determined intent, the system can then route the user to an appropriate flow, such as a user interface where the user can view information regarding the status of their recent order.

In either the text or audio based customer help systems, such trained machine learning models can determine one or more utterances from the user's text based or audio based inputs. For text based customer help systems, for example, machine learning models can process text inputted by a user into a chat feature of a user interface. For audio based customer help system, for example, machine learning models can process audio content provided by the user.

With examples described, a network computer system can be implemented as, or otherwise utilize, a distributed computing system, where the machine learning models can be trained and fine-tuned, as described. In examples, a network computer system can include, or otherwise utilize user mobile devices to acquire information (e.g., interactions with intents) and/or display content corresponding to the determined predicted intents.

One or more examples described herein provide that methods, techniques, and actions performed by a computing device are performed programmatically, or as a computer-implemented method. Programmatically, as used, means through the use of code or computer-executable instructions. These instructions can be stored in one or more memory resources of the computing device. A programmatically performed step may or may not be automatic.

Additionally, one or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs, or machines. Moreover, examples described herein can generally require the use of specialized computing devices, including processing and memory resources. For example, one or more examples described may be implemented, in whole or in part, on computing devices such as servers, desktop computers, cellular or smartphones, personal digital assistants (e.g., PDAs), laptop computers, printers, digital picture frames, network equipment (e.g., routers), wearable computing devices, and tablet devices. Memory, processing, and network resources may all be used in connection with the establishment, use, or performance of any example described herein (including with the performance of any method or with the implementation of any system). For instance, a computing device coupled to a data storage device storing the computer program and configured to execute the program corresponds to a special-purpose computing device. Furthermore, any computing systems referred to in the specification may include a single processor or may be architectures employing multiple processor designs for increased computing capability.

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described can be carried and/or executed. In particular, the numerous machines shown with examples described include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Alternatively, one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

System Description

Figure 1:
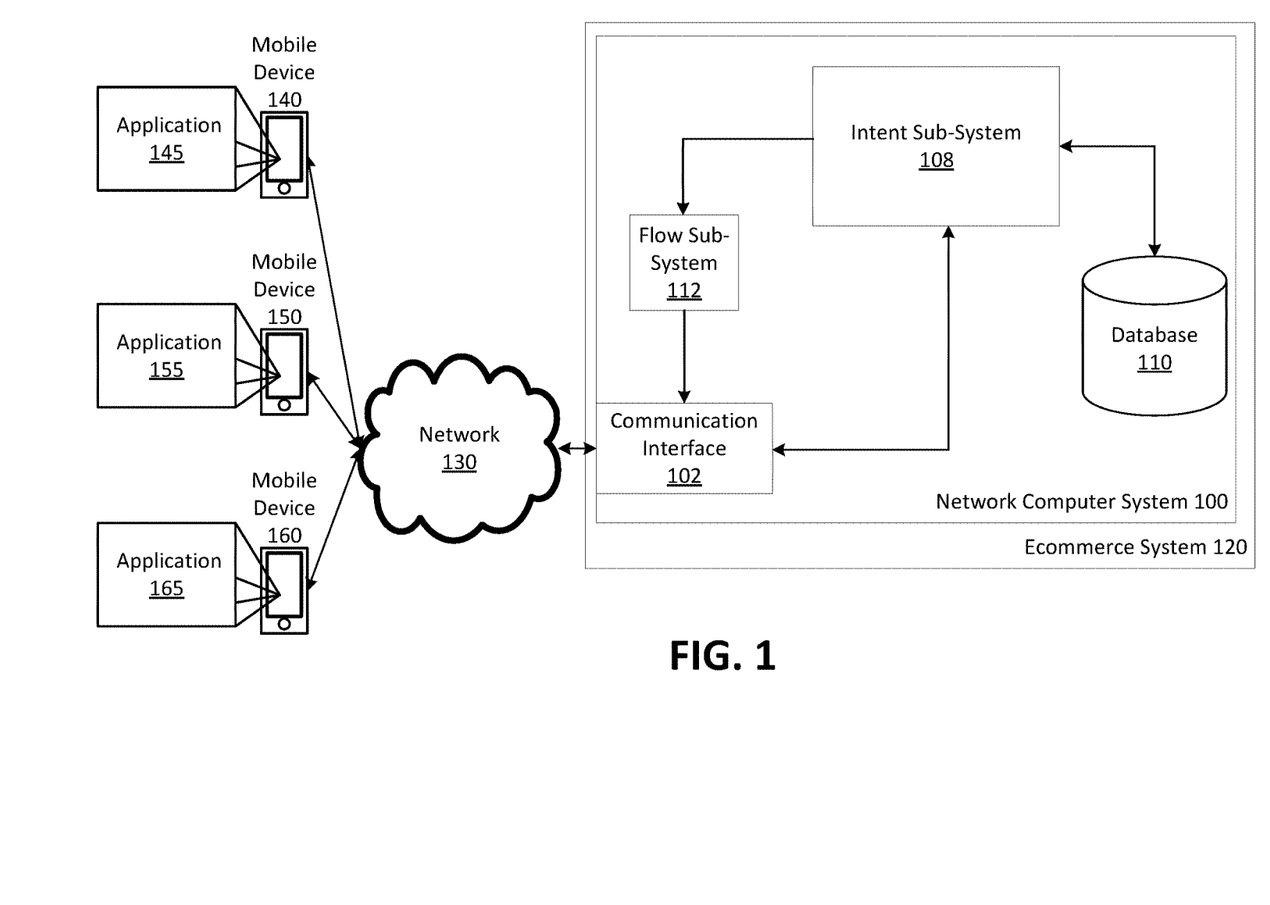
FIG. 1 illustrates an example network computer system for fine tuning an intent model.

FIG. 1 illustrates an example network computer system to fine tuning an intent model. As illustrated in FIG. 1, network computer system 100 and multiple mobile devices 140, 150 and 160, operatively coupled over network 130. Network computer system 100 can maintain and train an intent model. In various examples, network computer system 100 can utilize information utilize data or information, such as user feedback, obtained from one or more mobile device 140, 150 and 160, to fine tune the intent model.

In some examples, network computer system 100 can include intent sub-system 108. Intent sub-system 108 can maintain, train and retrain/fine tune an intent model. In various implementations, intent sub-system 108 can train the intent model on a training dataset that includes information of summaries of resolved user sessions. Additionally, the training dataset can be tagged by human agents, such that each summary has a corresponding one or more intent tags. Each intent tag can indicate a reason a corresponding user interacted or contacted a user help system.

A training dataset that is tagged by a human agent can be noisy (e.g., include data/information that is meaningless). As such, an intent model that is trained on such a training dataset can be inaccurate. The, for a trained intent model, network computer system 100 can remove or eliminate noise of the previous training dataset by utilizing a feedback dataset or user feedback. For example, intent sub-system 108 can obtain, from a mobile device (e.g., mobile device 140, 150), a feedback dataset including information about a user session. The information can indicate interactions between the user and a chat feature or interface of a user help system, such as any text inputted into the chat interface or any selectable features the user clicked on. The selectable features can be an interactive graphical representations corresponding to intents, intent sub-system 108 has predicted, based on utterances determined from the text inputted by the user.

In some implementations, mobile devices 140, 150 and 160 can be operated by users or human agents. Mobile devices 140, 150 and 160 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, network 130. Additionally, mobile computing devices 140, 150 and 160 can be each a cellular phone, a smart phone, a tablet, a personal assistant device, a voice assistant device, a digital assistant, a laptop, a computer, or any other suitable device. In some examples, network computer system 100 and mobile device 160 is operated and/or controlled by a retailer, and mobile device 140 and 150 are operated by customers of the retailer.

With respect to examples as described, the network computer system 100 can be implemented on a server, on a combination of servers, and/or on a distributed set of computing devices which communicate over a network such as the Internet. Still further, some examples provide for the network computer system 100 to be distributed using one or more servers and/or mobile devices. In some variations, the network computer system 100 can be implemented as part of, or in connection with an ecommerce system 120. In some examples, network computer system 100 can cause an ecommerce system to be displayed or otherwise communicated via one or more websites on mobile devices 140 and/or 150. Users can view, browse and order items that may be made available via the ecommerce system through a mobile device (e.g., mobile device 140, 150).

In various implementations, network computer system 100 can be a part of ecommerce system 120. Ecommerce system 120 can include a user help system. In such examples, a user can utilize the help system to make requests/inquiries and report issues pertaining to their ecommerce marketplace experience (e.g., track an order, request status of their order, request a refund, etc.). For example, a user can access a user help system of ecommerce system 120 by logging onto a website of an ecommerce marketplace that is generated on an application (e.g., application 145, 155) executing on a mobile device (e.g., mobile device 140, 150). The user help system can include a chat feature or interface that can enable the user to interact with the help system through the application. For instance, the user can input text corresponding to an inquiry about the status of their order. In turn, a human based or AI based agent can assist and help resolve an issue the user maybe having (e.g., tracking an order, starting a refund, requesting a status of an order, etc.).

In some implementations, network computer system 100 can leverage a machine learning model, such as an intent model, to intelligently and automatically assist users with ecommerce system related issues. For example, network computer system 100 can include intent sub-system 108 and flow sub-system 112 to intelligently and automatically route customers to appropriate flows that can help resolve the user's ecommerce system related issues (e.g., starting refunds, checking a status of an order, etc.).

In some examples, intent sub-system 108 can be configured to maintain, train and fine tune an intent model. The intent model can determine one or more intents of a user based on the input of the user. Additionally, flow sub-system 112 can help route customers to appropriate flows based on the determined one or more intents. For example, a trained intent model can process input, such as text, a user provided through a chat feature or interface through a mobile device (e.g., mobile devices 140, 150). In some examples, the input, such as text, can be regarding an issue the user would like resolved. Based on the processed input, the trained intent model can determine one or more utterances and predict one or more intents of the user (e.g., a user's reasoning for interacting with the user help system) that may correspond to the one or more utterances. Additionally, flow sub-system 112 can utilize the determined one or more intents to determine a corresponding flow or resolution process. In various implementations, flow sub-system 112 can generate user interface instructions based on the determined corresponding flow. Additionally, flow sub-system 112 can transmit the user interface instructions to the mobile device (e.g., mobile device 140, 150). The user interface instructions can cause the mobile device to generate content and/or a sequence of user interfaces to enable the operating user to resolve their issue. In some examples, the content and/or sequence of user interfaces generated can guide the operating user to resolving their issue.

In some implementations, network computer system 100 can include communication interface 102. In some examples, the communication interface 102 can establish one or more communication channels with each mobile device 140, 150 and 160. In other examples, communication interface 102 can communicate with applications 145, 155 and 165 to establish one or more communication channels with each of the corresponding mobile devices 140, 150, 160. For example, communication interface 102 can use applications executing on the mobile devices of users to establish secure sockets from which different types of mobile devices can communicate information (e.g., user feedback, user interactions with graphical representations of intents, user interface instructions etc.). The communication interface 102 can receive feedback datasets, which can be utilized by intent sub-system 108 to fine tune or update a trained intent model. Additionally, communication interface 102 can receive training datasets that includes information of summaries of resolved user sessions and agent tagged intents. Such training datasets can be utilized by intent sub-system 108 to train an intent model. The received feedback datasets and the received training datasets can be stored in database 110. Database 110 can be a remote storage device, such as a cloud-based server, a memory device on another application server, a networked computer, or any other suitable remote storage. In some implementations, database 110 can be a local storage device, such as a hard drive, a non-volatile memory, or a USB stick.

In some examples, database 110 can store one or more machine learning models, such as an intent model. Additionally, intent sub-system 108 may maintain the most current or recently trained/retrained version of the one or more machine learning models in database 110. In various implementations, database 110 stores a listing of predetermined utterances. Additionally, each predetermined utterance may be associated with one or more intent. In some examples, initially, the utterance-intent associations may be based on the training dataset obtained from mobile device 160 of a human agent. In other examples, intent sub-system 108 can update the utterance-intent associations based on feedback data. In some implementations, an utterance may be associated with multiple intents, where each of the multiple intents may have a corresponding weight or rank. The weight or rank can indicate an association strength between a particular intent an utterance (e.g., the higher the weight/rank, the stronger the association).

Network 130 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Network 130 can provide access to, for example, the Internet.

Figure 2:
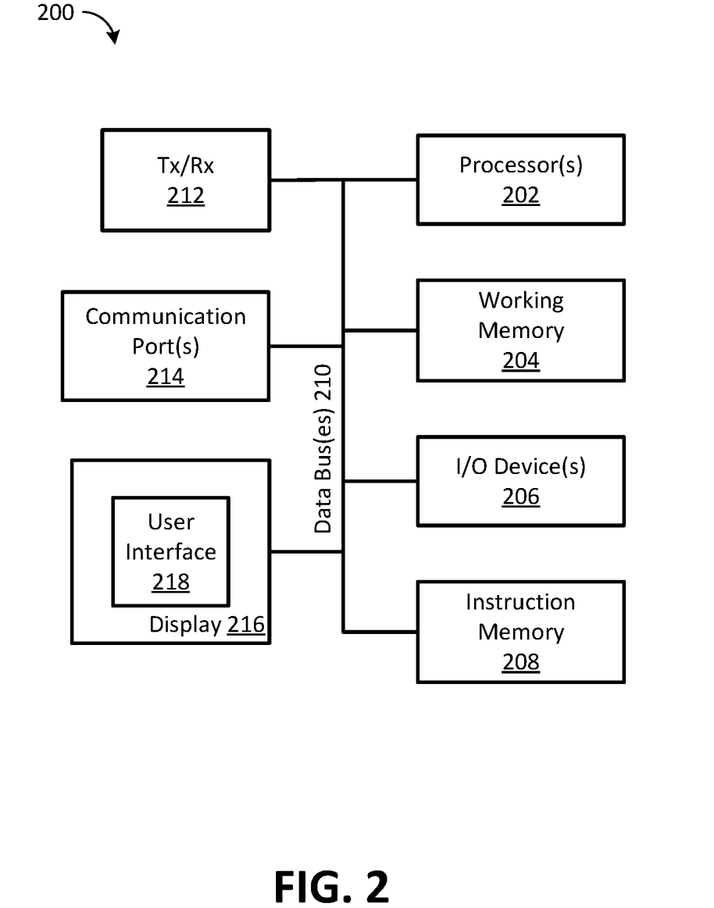
FIG. 2 illustrates and example computing device of the example network computer system of FIG. 1 in accordance with some embodiments.

FIG. 2 illustrates an example computing device 200. Network computer system 100 and/or the customer mobile devices 140, 150, 160 may include the features shown in FIG. 2. For the sake of brevity, FIG. 2 is described relative to network computer system 100. It should be appreciated, however, that the elements described can be included, as applicable, in mobile devices 140, 150, 160.

As shown, the network computer system 100 can be a computing device 200 that may include one or more processors 202, working memory 204, one or more input/output devices 206, instruction memory 208, a transceiver 212, one or more communication ports 214, and a display 216, all operatively coupled to one or more data buses 210. Data buses 210 allow for communication among the various devices. Data buses 210 can include wired, or wireless, communication channels.

Processors 202 can include one or more distinct processors, each having one or more cores. Each of the distinct processors can have the same or different structure. Processors 202 can include one or more central processing units (CPUs), one or more graphics processing units (GPUs), application specific integrated circuits (ASICs), digital signal processors (DSPs), and the like.

Processors 202 can be configured to perform a certain function or operation by executing code, stored on instruction memory 208, embodying the function or operation. For example, processors 202 can be configured to perform one or more of any function, method, or operation disclosed herein.

Instruction memory 208 can store instructions that can be accessed (e.g., read) and executed by processors 202. For example, instruction memory 208 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 202 can store data to, and read data from, working memory 204. For example, processors 202 can store a working set of instructions to working memory 204, such as instructions loaded from instruction memory 208. Processors 202 can also use working memory 204 to store dynamic data created during the operation of computing device 200. Working memory 204 can be a random access memory (RAM) such as a static random access memory (SRAM) or dynamic random access memory (DRAM), or any other suitable memory.

Input/output devices 206 can include any suitable device that allows for data input or output. For example, input/output devices 206 can include one or more of a keyboard, a touchpad, a mouse, a stylus, a touchscreen, a physical button, a speaker, a microphone, or any other suitable input or output device.

Communication port(s) 214 can include, for example, a serial port such as a universal asynchronous receiver/transmitter (UART) connection, a Universal Serial Bus (USB) connection, or any other suitable communication port or connection. In some examples, communication port(s) 214 allows for the programming of executable instructions in instruction memory 208. In some examples, communication port(s) 214 allow for the transfer (e.g., uploading or downloading) of data, such as recommendation data and customer interaction data.

Display 216 can display a user interface 218. User interface 218 can enable user interaction with computing device 200. For example, user interface 218 can be a user interface that allows an operator to interact, communicate, control and/or modify different features or parameters of computing device 200. The user interface 218 can, for example, display the performance of the computing device 200 using different textual, graphical or other types of graphs, tables or the like. In some examples, a user can interact with user interface 218 by engaging input/output devices 206. In some examples, display 216 can be a touchscreen, where user interface 218 is displayed on the touchscreen.

Transceiver 212 allows for communication with a network, such as the network 130 of FIG. 1. For example, if network 130 of FIG. 1 is a cellular network, transceiver 212 is configured to allow communications with the cellular network. In some examples, transceiver 212 is selected based on the type of network 130 network computer system 100 will be operating in. Processor(s) 202 is operable to receive data from, or send data to, a network, such as network 130 of FIG. 1, via transceiver 212.

Figure 3:
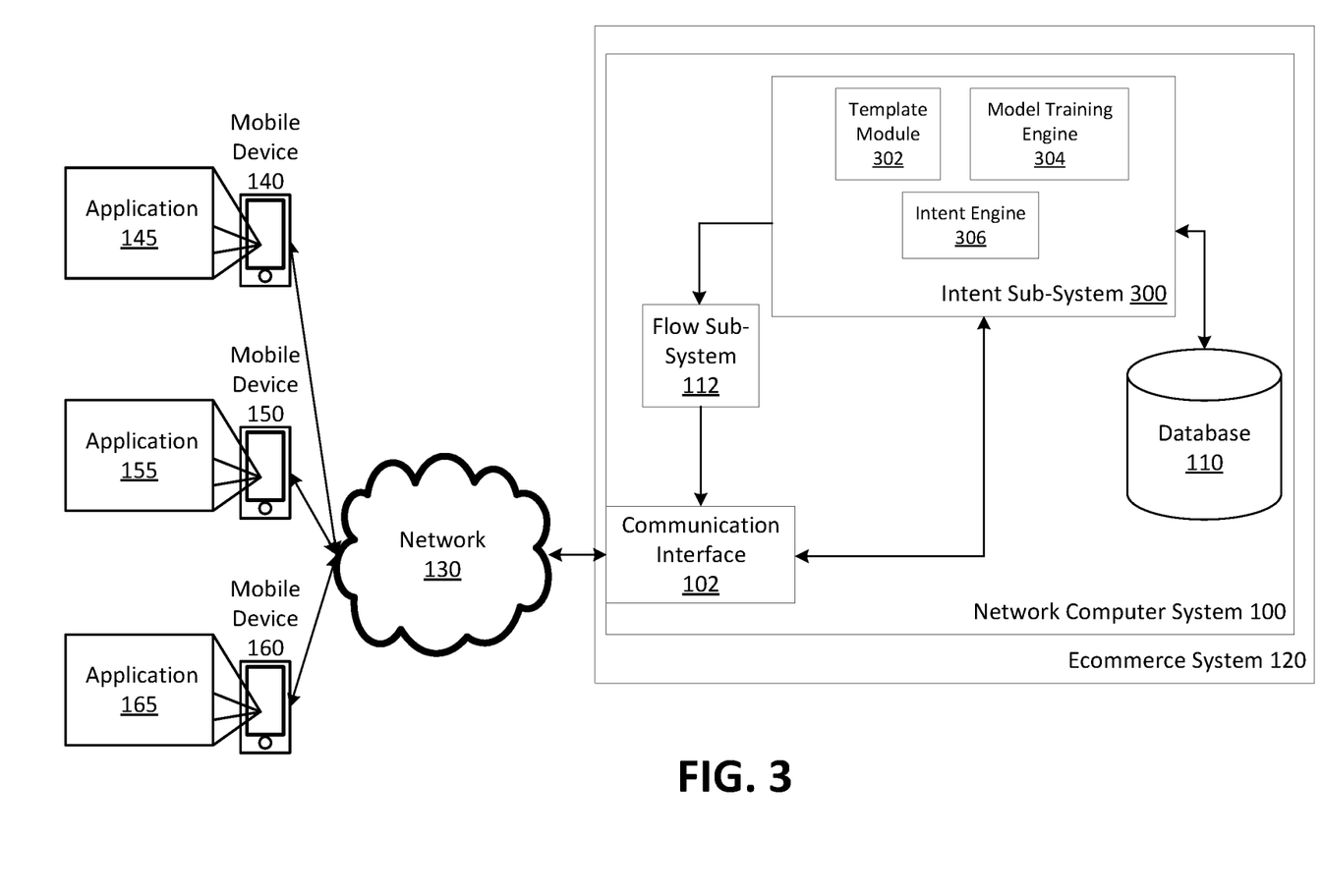
FIG. 3 illustrates further aspects of an example intent sub-system.

FIG. 3 illustrates further aspects of an example intent sub-system. Similar to the intent sub-system 108 of FIG. 1, intent sub-system 300 of FIG. 3 can maintain, train and fine tune or retrain an intent model. As illustrated in FIG. 3, intent sub-system 300 can include intent engine 306. Intent engine 306 can be configured to utilize a trained intent model to determine one or more utterances from a user input, such as text, and one or more corresponding predicted intents.

In some implementations, intent sub-system 300 can include model training engine 304. Model training engine 304 can train an intent model (stored in database 110) on a training dataset that includes information of summaries of resolved user sessions. In some examples, a human agent can tag the training dataset so that it includes corresponding intents for each summary. Additionally, the agent can transmit, from mobile device 160, the training dataset to network computer system 100, over network 130.

A training dataset that is tagged by a human agent can be noisy (e.g., include data/information that is meaningless). As such, an intent model that is trained on the training dataset tagged by a human agent can be inaccurate. Intent sub-system 300 can remove or eliminate such noise by utilizing a feedback dataset. For example, a user of mobile device 140 can log onto a user help system of ecommerce system 120 and access a chat interface or feature. During the user's session on the chat interface, the user can make inquiries or requests pertaining to an issue they may have with the ecommerce system 120 by providing input, such as text, to the chat interface from mobile device 140. Intent engine 306 can obtain such inputs, and utilizing the trained intent model, determine at least one utterance and a set of corresponding predicted intents. Additionally, intent engine 306 can transmit user interface instructions to mobile device 140 to cause application 145 to update the chat interface into include content related to the set of corresponding predicted intents. In some examples such content can include graphical representations of each of the set of corresponding predicted intents. For example, the intent can correspond to returns, and as such, the content generated can include interactive features, such as buttons, labeled "Start a return" or "return policy."

Mobile device 140 can transmit feedback data to intent sub-system 300. The feedback data can include information indicating interactions that may have occurred on mobile device 140 between the user and any of the content of the set of corresponding predicted intents. For example, mobile device 140 can generate feedback data pertaining to whether the user interacted, such as clicked on, any of the "start a return" or "return" policy. In examples where the chat interface is being presented on a website hosted by ecommerce system 120, network computer system 100 can monitor, through the website being accessed by mobile device 140, interactions between the user and any of the presented content of the set of corresponding predicted intents. In such examples, network computer system 100 can generate feedback data that includes information of such interactions (e.g., whether the user interacted, such as clicked on, any of the "start a return" or "return" policy). In other examples, network computer system 100 can monitor the interactions between the user and any of the presented content of the set of corresponding predicted intents, through application 145. In such examples, network computer system 100 can generate feedback data that includes information of such interactions (e.g., the user clicked on the "start a return" or "return" policy).

Based on the feedback data, model training engine 304 can confirm or validate which of the predicted intents are to correspond to the determined utterance and which of the predicted intents are to be discounted. For example, model training engine 304 can obtain for a particular utterance, determination information from intent engine 306. The determination information can indicate, for a particular iteration of the trained intent model, a determined utterance and a determined corresponding a set of predicted intents, such as "starting a return," and "tracking an order." Based on the feedback data, which indicates that the user clicked on selectable features corresponding to "starting a return," the model training engine 304 can determine that the determined utterance corresponds to the intent "starting a return," and not "tracking an order." As such, based on such determinations, model training engine 304 can retrain the trained intent model such that, for that utterance, the corresponding intent is more likely pertaining to "starting a return." Additionally, based on such determinations, model training engine 304 can retrain the trained intent model such that, for that utterance, the intents pertaining to "tracking an order" can be discounted/disassociated. In some implementations, the retrained intent model can be stored in database 110.

In some implementations, intent engine 306 can implement a process to rank and select intents in accordance with the likelihood that the intents correspond to the determined utterances. Such processes can initially be based on information from the training datasets. For example, intent engine 306 can utilize the training datasets to determine for each user session one or more utterances. Additionally, intent engine 306 can further determine, based on the agent indicated intent tags of each session, a frequency of an intent-utterance association/relationship. Such frequencies can be used to determine, for a given utterance, a weight for a particular intent. For example, the greater the frequency, the higher the weight or rank. In some examples, intent engine 306 can utilize a trained intent model to select a predetermined number of predicted intents that may correspond to a determined utterance, based on each predicted intents ranking. For example, intent engine 306 can utilize the trained intent model to select the top 2 ranked predicted intents that may correspond to the determined utterance.

In some implementations, model training engine 304 can incorporate one or more template based rules when training the intent model. Template based rules can configure the intent model to select a particular intent based on a particular determined utterance. In some examples, some of the template based rules can pertain to simple default interactions such as "contact agent," "no," and "yes." In other examples, a template based rule can pertain to new interactions. Such template based rules enable the intent model to adapt to new user behavior changes or new types of intents. For example, during a pandemic and the increase societal demand for testing and vaccines, a template based rules pertaining to testing for a particular illness or disease or a particular type of vaccination can be incorporated into the training of the intent model. The template based rule can map out, for example, a particular utterance and a corresponding new or emerging type of intent (e.g., setting up an appointment for a particular new type of vaccine).

Methodology

Figure 4:
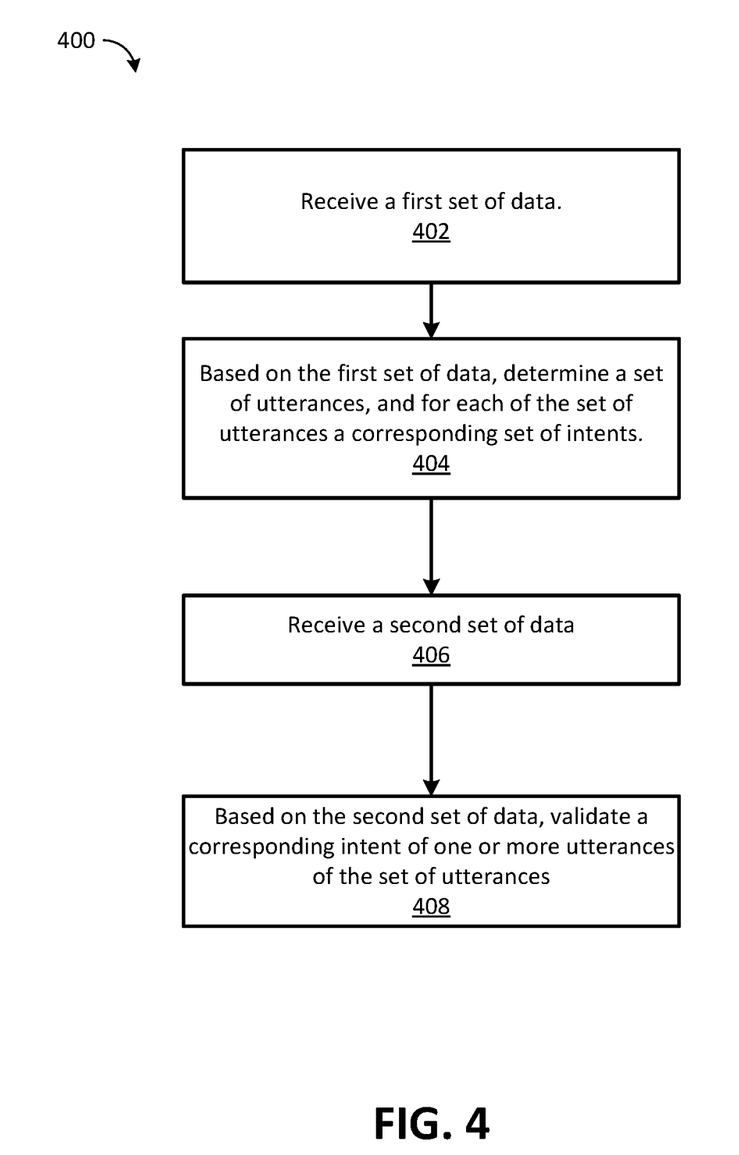
FIG. 4 illustrates a flow chart of an example method for fine tuning an intent model.
Figure 6:
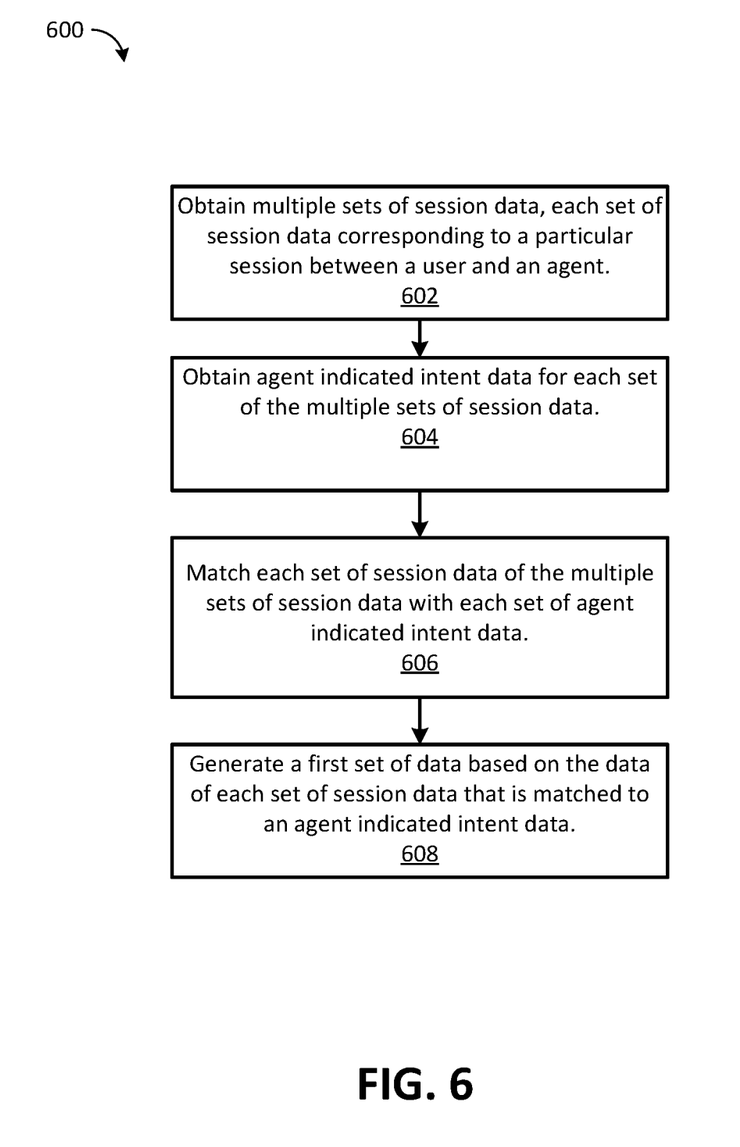
FIG. 6 illustrates a flow chart of an example method for aggregating training data.
Figure 8:
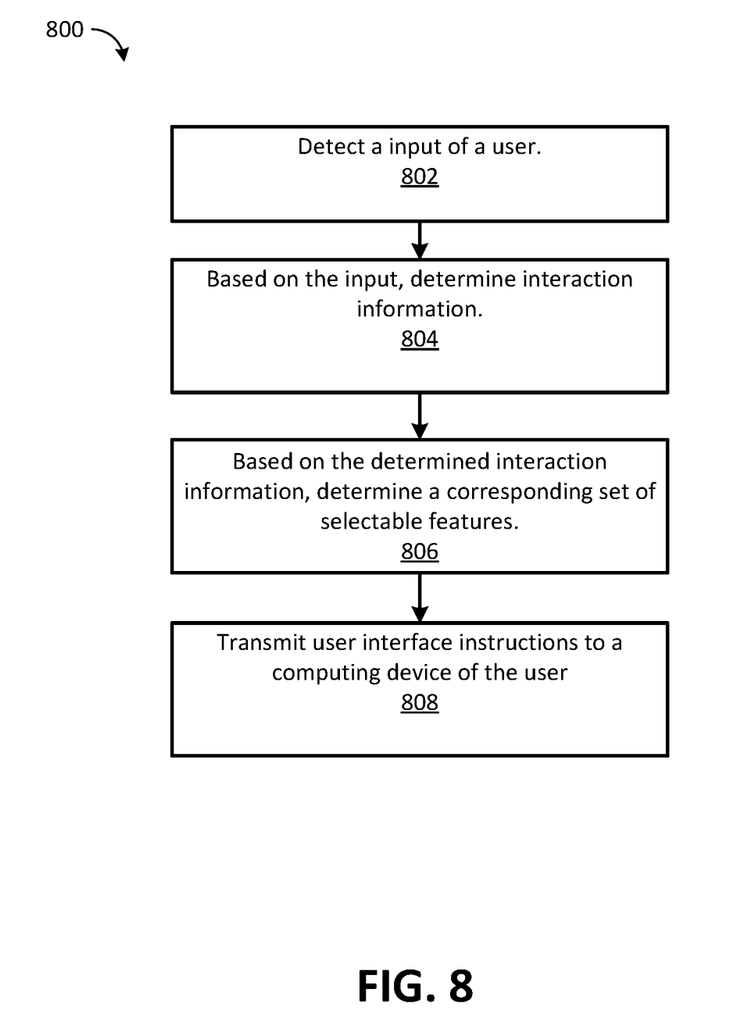
FIG. 8 illustrates a flowchart of an example method of updating a currently displayed UI.

FIG. 4 illustrates a flow chart of an example method for fine tuning an intent model. FIG. 6 illustrates a flow chart of an example method for aggregating training data. FIG. 8 illustrates a flow chart for an example method of updating a user interface (UI). In describing an example of FIGS. 4, 6 and 8, reference is made to elements of FIG. 1 or 3 for purpose of illustrating a suitable component for performing a set or sub-step being described.

With reference to example method 400 of FIG. 4, network computer system 100 can receives] a first set of data (402). The first set of data or training data can include information pertaining to resolved user sessions. For example, the information can include summaries of each resolved user session.

Additionally, the first set of data can include agent tagged intents for each of the summaries.

Based on the first set of data, network computer system 100 can determine a set of utterances, and for each of the set of utterances a corresponding set of intents (404). For example, model training engine 304 can utilize the first set of data or a training dataset to train an intent model. Additionally, intent engine 306 can utilize the trained intent model to initially determine which utterances are potentially associated with which one or sets of intents.

Additionally, network computer system 100 can receive a second set of data (404). The second set of data or feedback data can include information indicating interactions that may have occurred on mobile device 140 between the user and any of the content of the set of corresponding predicted intents.

For example, a user of mobile device 140 can log onto a user help system of ecommerce system 120 and access a chat interface or feature. During the user's session on the chat interface, the user can make inquiries or requests pertaining to an issue they may have with the ecommerce system 120 by providing input, such as text, to the chat interface from mobile device 140. Intent engine 306 can obtain such inputs, and utilizing the trained intent model, determine at least one utterance and a set of corresponding predicted intents. Additionally, intent engine 306 can transmit user interface instructions to mobile device 140 to cause application 145 to update the chat interface into include content related to the set of corresponding predicted intents. In some examples such content can include graphical representations of each of the set of corresponding predicted intents. For example, the intent can correspond to returns, and as such, the content generated can include interactive features, such as buttons, labeled "Start a return" or "return policy."

Figure 5:
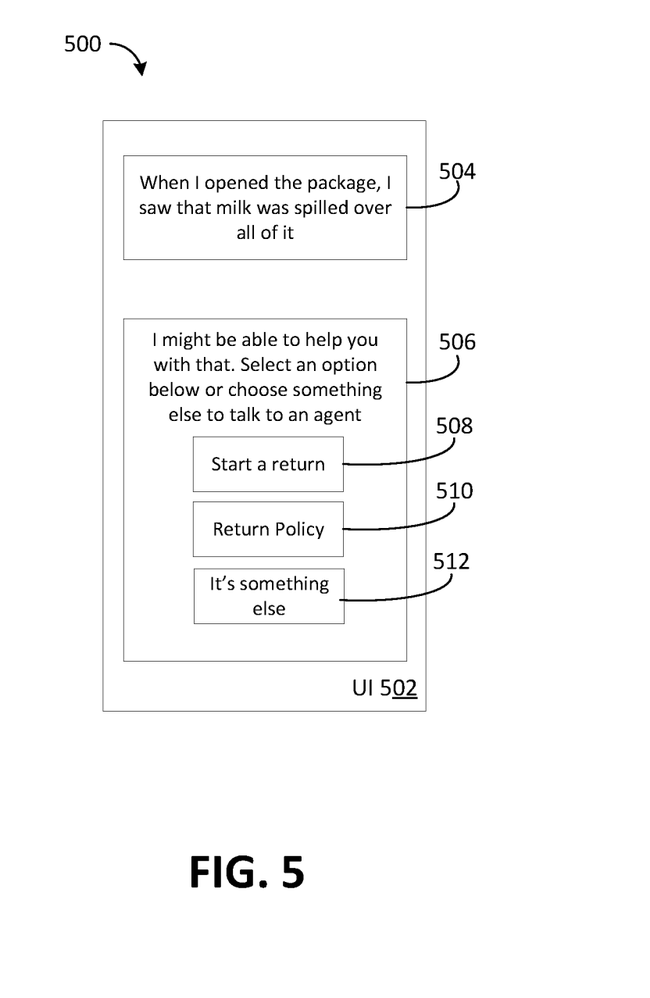
FIG. 5 illustrates an example user interface (UI) of a user session between a user and an artificial intelligence (AI) based agent.

FIG. 5 illustrates an example UI of a user session between a user and an AI-based agent. Example UI 500 illustrates an example UI chat interface, where a user is making an inquiry about an issue they have with the ecommerce system 120, and an AI based agent is assisting the user to resolve the issue. In the chat interface, the user has provided input 504 that includes language pertaining to an issue they had with one of their orders. Additionally, the chat interface also includes a response 506 from an AI based agent. The response can be based off of determinations made by intent engine 306 utilizing a trained intent model. For example, based on the text of input 504, intent engine 306 has determined two corresponding predicted intents—"start a return" and "return policy." As illustrated in FIG. 5, such intents, can be represented by an interactive graphical feature 508 and 510. In some examples, intent engine 306 can transmit user interface instructions to a corresponding mobile device (e.g., mobile device 140, 150) that causes the mobile device to generate such graphical features.

Additionally, intent sub-system 300 can monitor the interactions between the user and the presented content of the set of corresponding predicted intents. For example, turning to FIG. 5, mobile device 140 can generate feedback data pertaining to whether the user interacted, such as clicked on, any of the graphical features 508 or 510 that represent "start a return" or "return policy." In examples where the chat interface is being presented on a website hosted by ecommerce system 120, network computer system 100 can monitor, through the website being accessed by mobile device 140, interactions between the user and any of the presented content of the set of corresponding predicted intents. In such examples, network computer system 100 can generate feedback data that includes information of such interactions (e.g., whether the user interacted, such as clicked on, any of the "start a return" or "return" policy). In other examples, network computer system 100 can monitor the interactions between the user and any of the presented content of the set of corresponding predicted intents, through application 145. In such examples, network computer system 100 can generate feedback data that includes information of such interactions (e.g., whether the user interacted, such as clicked on, any of the "start a return" or "return" policy).

Based on the second set of data, network computer system 100 can validate a corresponding intent to one or more utterances of the set of utterances (408). For example, model training engine 304 can utilize the second set of data to confirm or validate which of the predicted intents are to correspond to the determined utterance and which of the predicted intents are to be discounted. For example, turning to the example illustrated in FIG. 5, model training engine 304 can obtain, from intent engine 306, a determined utterance based on the text of input 504, and determination information. The determination information can indicate, for a particular iteration of the trained intent model, a determined utterance and a determined corresponding a set of predicted intents, such as "starting a return," and "return policy." Based on the feedback data, which indicates that the user clicked on selectable features corresponding to "starting a return," the model training engine 304 can determine that the determined utterance corresponds to the intent "starting a return," and not "return policy." As such, based on such determinations, model training engine 304 can retrain the trained intent model such that, for that utterance, the corresponding intent is more likely pertaining to "starting a return." Additionally, or alternatively, based on such determinations and taking into account the initially determined utterance-intents associations (see step 404), model training engine 304 can retrain the trained intent model such that, for that utterance, the intents pertaining to "return policy" can be discounted/disassociated or even weighed less.

With reference to example method 600 of FIG. 6, network computer system 100 can obtain multiple sets of session data (602). For example, model training engine 304 can obtain such multiple sets of session data. In some examples, each set of session data corresponds to a particular resolved user session between a user and an agent. In such examples, the agent can be human. Additionally, each set of session data can include information, such as a summary of a corresponding resolved user session and an identifier, such as a session ID. For example, a user of mobile device 150 can onto a user help system of ecommerce system 120 and access a chat interface or feature. During the user's session on the chat interface, the user can make inquiries or requests pertaining to an issue they may have with the ecommerce system 120 by providing input, such as text, to the chat interface from mobile device 140. The input can be routed to an agent operating mobile device 160. Additionally, the agent operating mobile device 160 can respond to and assist the user of mobile device 150 resolve their issue.

Figure 7:
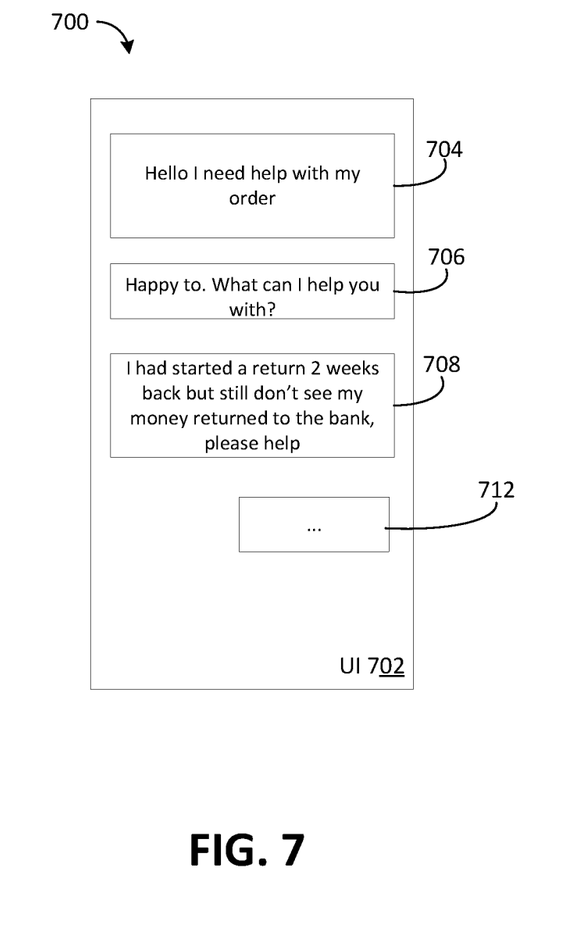
FIG. 7 illustrates an example UI of a user session between a user and a human agent.

FIG. 7 illustrates an Example UI of a user session between a user and a human agent. Example UI 700 illustrates and example UI chat interface and a conversation between a user, such as a user of mobile device 150, and an agent, such as an agent of mobile device 160. As illustrated in FIG. 7, UI 702 includes the user's input 704 and 708, and agent's input 706. Graphical representation 708 can indicate that an agent and/or a user is currently inputting a response.

Network computer system 100 can also obtain agent indicated intent data for each set of the multiple sets of session data (604). For example, model training engine 304 can obtain such agent indicated intent data for each set of the multiple sets of session data, from mobile device 160. In some examples, the agent indicated intent data can include information indicating an intent and an identifier, such as a session ID.

Additionally, network computer system 100 can match each set of session data of the multiple sets of session data with each set of agent indicated intent data (606). For example, model training engine 304 can match each set of session data with a corresponding set of agent indicated intent data based on the identifiers of each set of session data and the agent indicated intent data.

Moreover, network computer system 100 can generate a first set of data based on the data of each set of session data that is matched to an agent indicated intent data. (608). For example, model training engine 304 can generate a first set of data or training data that includes information regarding user sessions. Additionally, the information of the user sessions, can pertain to resolved customer issues and the interaction between the user and a human agent. Moreover, the first set of data can include the agent indicated tags that correspond or match to each of the resolved user sessions.

With reference to example method 800 of FIG. 8, network computer system 100 can detect an input of a user (802). In examples where the chat interface is being presented on a website hosted by ecommerce system 120, network computer system 100 can monitor, through the website being accessed by mobile device (e.g., mobile device 140, 150), interactions between the user and any of the presented content of the set of corresponding predicted intents. In such examples, network computer system 100 can detect an input and generate feedback data that includes information of such interactions of a user of the mobile device. For example, referring to FIG. 5, network computer system 100 can detect whether the user interacted with interactive graphical feature 508 or 510. In other examples, network computer system 100 can detect an input of a user based on data transmitted from a mobile device (mobile device 140, 150). The data can include information indicating interactions that may have occurred through the mobile device between the user and any of the content of the set of corresponding predicted intents (e.g., interactive graphical feature 508 or 510).

Based on the input, network computer system 100 can determine interaction information (804). The interaction information can indicate interactions between the user and any content of the set of corresponding predicted intents. For example, in the chat feature or interface of a user help system context, interaction information can indicate which interactive graphical feature the user clicked on.

Based on the determined interaction information, network computer system 100 can determine a corresponding set of selectable features (806). For example, network computer system 100 can determine content corresponding to an interactive graphical feature the user interacted with (e.g., clicked on). The content can include one or more, or a set of selectable features that can assist with resolving an issue of a user.

Additionally, network computer system 100 can transmit user interface instructions to a mobile device of the user (808). In some examples, the user interface instructions can cause a mobile device of a user (e.g., mobile device 140, 150) to generate the determined content. In various implementations, the content can include one or more, or a set of selectable features that can assist with resolving an issue of a user. Additionally, or alternatively, the user interface instructions can cause the mobile device to generate content and/or a sequence of user interfaces to enable the operating user to resolve their issue. In some examples, the content and/or sequence of user interfaces generated can guide the operating user to resolving their issue.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The term model as used in the present disclosure includes data models created using machine learning. Machine learning may involve training a model in a supervised or unsupervised setting. Machine learning can include models that may be trained to learn relationships between various groups of data. Machine learned models may be based on a set of algorithms that are designed to model abstractions in data by using a number of processing layers. The processing layers may be made up of non-linear transformations. The models may include, for example, artificial intelligence, neural networks, deep convolutional and recurrent neural networks. Such neural networks may be made of up of levels of trainable filters, transformations, projections, hashing, pooling and regularization. The models may be used in large-scale relationship-recognition tasks. The models can be created by using various open-source and proprietary machine learning tools known to those of ordinary skill in the art.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
one or more processors;
a set of memory resources to store a set of instructions that when executed by the one or more processors, cause the system to:
  receive a first set of data, the first set of data including information indicating a first set of resolved user sessions of first customers, each of the first set of resolved user sessions having an associated summary and a corresponding agent indicated intent;
  train a machine learning model based on the first set of data that includes information regarding resolved user sessions and corresponding agent indicated intents;

based on the first set of data, determine a set of utterances of the first customers and for the set of utterances a corresponding set of intents for the first customers;

receive a second set of data, the second set of data including information indicating a second set of user sessions of second customers, each of the second set of user sessions having an associated determined utterance and corresponding interaction information of a second customer;

based on the second set of data including information indicating determined utterances and corresponding interaction information of the second customers, determine whether a corresponding intent of each utterance of the set of utterances of the first customers is validated to be a correct intent or not, to generate validated intent data for the first customers based on:

determining, among the corresponding set of intents for the first customers, a first intent that was not validated based on the second set of data, disassociating the first intent from the set of utterances; and retrain the machine learning model based on the second set of data and the validated intent data.

2. The system of claim 1, wherein the validated intent data is generated based on:

determining, among the corresponding set of intents for the first customers, a second intent that was validated based on the second set of data; and confirming an association of the second intent with the set of utterances.

3. The system of claim 2, wherein the machine learning model is retrained further based on the first set of data.

4. The system of claim 1, wherein determining the set of utterances and for each utterance of the set of utterances the corresponding set of intents, is further based on one or more template based rules.

5. The system of claim 1, wherein execution of the set of instructions, by the one or more processors, further cause the system to:

detect an input of a user;

determine an utterance from a plurality of predetermined utterances by processing the input;

based on the determined utterance from the plurality of predetermined utterances, the determined set of utterances, and for each of the set of utterances the corresponding set of intents, determine a set of predicted intents; and based on the set of predicted intents, generate and transmit user interface instructions to a computing device of the user to cause an application executing on the computing device to generate, on a user interface, a graphical representation of each predicted intent of the set of predicted intents.

6. The system of claim 5, wherein the interaction information indicates the user selected a generated graphical representation of one of the set of predicted intents.

7. The system of claim 5, wherein execution of the set of instructions, by the one or more processors, further causes the system to:

detect a second input of the user, the second input of the user being indicative of an interaction with a generated graphical representation of one of the set of predicted intents;

based on the second input, determine a corresponding set of selectable features; and transmit user interface instructions to the computing device of the user to cause the application executing on the computing device to update the user interface to include the corresponding set of selectable features.

8. The system of claim 7, wherein each of the set of selectable features are configured to cause the application to perform one or more service operations when interacted with.

9. A computer-implemented method comprising:

receiving a first set of data, the first set of data including information indicating a first set of resolved user sessions of first customers, each of the first set of resolved user sessions having an associated summary and a corresponding agent indicated intent;

training a machine learning model based on the first set of data that includes information regarding resolved user sessions and corresponding agent indicated intents;

based on the first set of data, determining a set of utterances of the first customers and for the set of utterances a corresponding set of intents for the first customers;

receiving a second set of data, the second set of data including information indicating a second set of user sessions of second customers, each of the second set of user sessions having an associated determined utterance and corresponding interaction information of a second customer;

based on the second set of data including information indicating determined utterances and corresponding interaction information of the second customers, determine whether a corresponding intent of each utterance of the set of utterances of the first customers is validated to be a correct intent or not, to generate validated intent data for the first customers based on:

determining, among the corresponding set of intents for the first customers, a first intent that was not validated based on the second set of data, disassociating the first intent from the set of utterances; and retraining the machine learning model based on the second set of data and the validated intent data.

10. The computer-implemented method of claim 9, wherein the validated intent data is generated based on:

determining, among the corresponding set of intents for the first customers, a second intent that was validated based on the second set of data; and confirming an association of the second intent with the set of utterances.

11. The computer-implemented method of claim 9, wherein retraining the machine learning model is further based on the first set of data.

12. The computer-implemented method of claim 9, wherein determining the set of utterances and for each utterance of the set of utterances the corresponding set of intents, is further based on one or more template based rules.

13. The computer-implemented method of claim 9, further comprising:

detecting an input of a user;

determining an utterance from a plurality of predetermined utterances by processing the input;

based on the determined set of utterances and for each of the set of utterances the corresponding set of intents, determining a set of predicted intents; and based on the set of predicted intents, generating and transmit user interface instructions to a computing device of the user to cause an application executing on the computing device to generate, on a user interface, a graphical representation of each predicted intent of the set of predicted intents.

14. The computer-implemented method of claim 13, wherein the interaction information indicates the user selected a generated graphical representation of one of the set of predicted intents.

15. The computer-implemented method of claim 13, further comprising:
   detecting a second input of the user, the second input of the user being indicative of an interaction with a generated graphical representation of one of the set of predicted intents;
   based on the second input, determining a corresponding set of selectable features; and
   transmitting user interface instructions to the computing device of the user to cause the application executing on the computing device to update the user interface to include the corresponding set of selectable features.

16. The computer-implemented method of claim 15, wherein each of the set of selectable features are configured to cause the application to perform one or more service operations when interacted with.

17. A non-transitory computer readable medium having instructions stored thereon, wherein the instructions, when executed by one or more processors, cause a computing system to:
   receive a first set of data, the first set of data including information indicating a first set of resolved user sessions of first customers, each of the first set of resolved user sessions having an associated summary and a corresponding agent indicated intent;
   train a machine learning model based on the first set of data that includes information regarding resolved user sessions and corresponding agent indicated intents;
   based on the first set of data, determine a set of utterances of the first customers and for the set of utterances a corresponding set of intents for the first customers;
   receive a second set of data, the second set of data including information indicating a second set of user sessions of second customers, each of the second set of user sessions having an associated determined utterance and corresponding interaction information of a second customer;
   based on the second set of data including information indicating determined utterances and corresponding interaction information of the second customers, determine whether a corresponding intent of each utterance of the set of utterances of the first customers is validated to be a correct intent or not, to generate validated intent data for the first customers based on:
      determining, among the corresponding set of intents for the first customers, a first intent that was not validated based on the second set of data,
      disassociating the first intent from the set of utterances; and
   retrain the machine learning model based on the second set of data and the validated intent data.

18. The non-transitory computer readable medium of claim 17, wherein the validated intent data is generated based on:
   determining, among the corresponding set of intents for the first customers, a second intent that was validated based on the second set of data; and
   confirming an association of the second intent with the set of utterances.

19. The non-transitory computer readable medium of claim 17, wherein determining the set of utterances and for each utterance of the set of utterances the corresponding set of intents, is further based on one or more template based rules.

20. The non-transitory computer readable medium of claim 17, wherein execution of the instructions, by the one or more processors, further cause the computing system to:
   detect an input of a user;
   determine an utterance from a plurality of predetermined utterances by processing the input;
   based on the determined set of utterances and for each of the set of utterances the corresponding set of intents, determine a set of predicted intents; and
   based on the set of predicted intents, generate and transmit user interface instructions to a computing device of the user to cause an application executing on the computing device to generate, on a user interface, a graphical representation of each predicted intent of the set of predicted intents.

* * * * *